J. O. CARREY.
ART OF PACKING PISTONS.
APPLICATION FILED APR. 26, 1919.

1,375,207.

Patented Apr. 19, 1921.

Attest.
Charles A. Becker.

Inventor.
John O. Carrey,
by Rippey & Kingsland,
His Attorneys.

UNITED STATES PATENT OFFICE.

JOHN O. CARREY, OF ST. LOUIS, MISSOURI, ASSIGNOR TO CARREY ROTARY ENGINE COMPANY, OF ST. LOUIS, MISSOURI, A CORPORATION OF MISSOURI.

ART OF PACKING PISTONS.

1,375,207.   Specification of Letters Patent.   Patented Apr. 19, 1921.

Application filed April 26, 1919. Serial No. 292,933.

*To all whom it may concern:*

Be it known that I, JOHN O. CARREY, a citizen of the United States, residing at the city of St. Louis and State of Missouri, have invented a new and useful Art of Packing Pistons, of which the following is a specification.

This invention relates to the art of packing pistons.

An object of the invention is to provide an improved method of maintaining a liquid seal or packing in connection with engine pistons.

Another object of the invention is to provide an improved means for maintaining a liquid seal or packing in connection with an engine piston.

Figure 1:
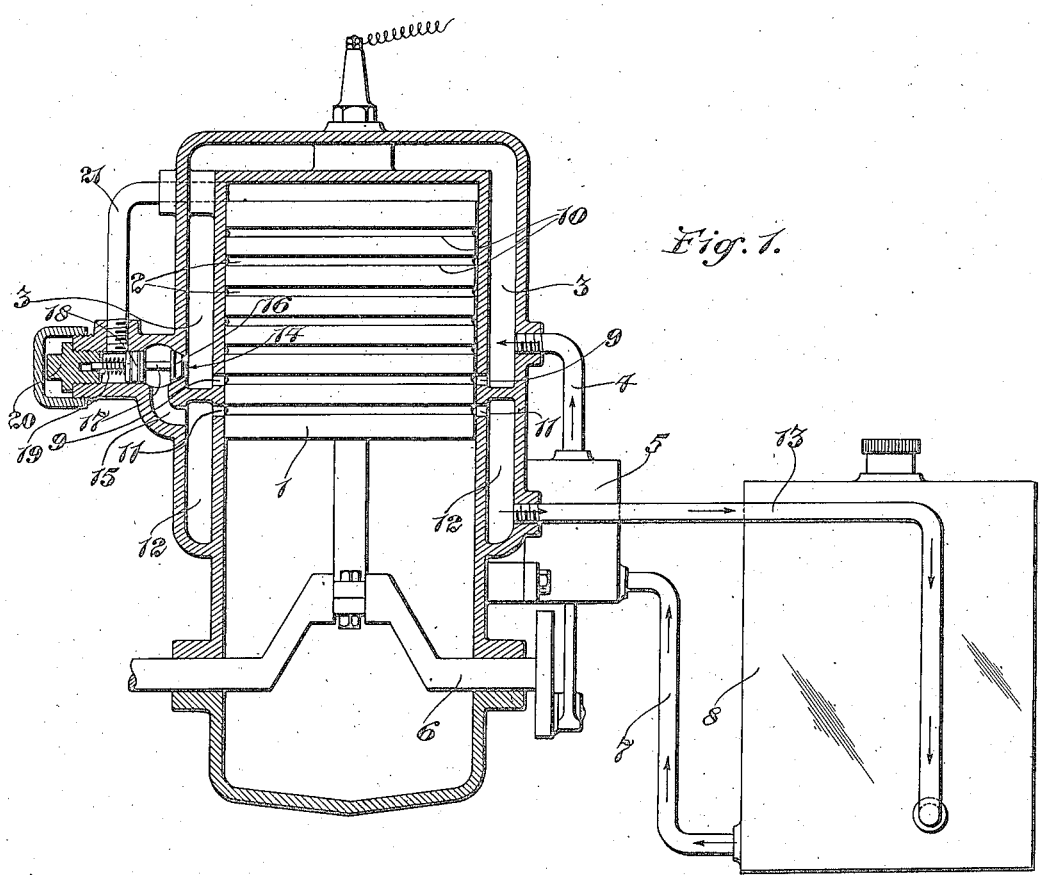
Figure 1 is a view illustrating means for maintaining a liquid seal or packing in connection with the piston of an engine.

As shown, the piston 1 is formed with a number of circumferential grooves 2, adapted to receive water or other appropriate liquid for maintaining perfect seal between the piston and the wall of the cylinder, so as to dispense with the necessity of using piston rings or other mechanical packing elements.

As shown, the engine is formed with a liquid chamber 3 to which liquid is supplied through a pipe 4. Liquid may be forced into the chamber 3 by operation of a pump 5 driven by the crank shaft 6 of the engine. The liquid enters the pump through a pipe 7 communicating with a tank 8.

From the chamber 3 the liquid passes through a plurality of openings 9 across which the piston moves so that the liquid, being maintained under pressure, will pass through the openings 9 into the grooves 2, thus maintaining a perfect liquid seal. No material quantity of the liquid will rise above the piston, because the pressure is so equalized that the liquid will remain in the grooves. It is understood, of course, that when the piston is down there is less pressure in the space above the piston. Under this condition if the pressure of the liquid in the chamber 3 remained constant part of the liquid might be forced out of the grooves 2 into the space above the piston. To prevent this I provide a pressure equalizing device by which the pressure of the liquid in the chamber 3 is reduced as an incident to downward movement of the piston.

As shown, a passage 14 through the outer wall of the chamber 3 opens into a valve chamber from which a passage 15 opens into the chamber 12. A puppet valve 16 controls the passage 14 and is provided with a stem 17 to which is attached a piston head 18. A spring 19 encircles the stem 17 between the piston head 18 and the plug 20, said spring acting to press the valve toward closed position within the passage 14. A passage 21 opens into the cylinder above the piston and also opens into the space within the piston head 18 and the plug 20. As a result of this construction it is apparent that when the piston 1 moves upwardly to position of compression it will create pressure through the pipe 21 behind the piston head 18, and thereby force the valve 16 to closed position so that the pressure of the liquid within the chamber 3 may be increased to the maximum. When the piston 1 moves downwardly the pressure in the cylinder above the piston is reduced to a point lower than the pressure in the chamber 3. This permits the pressure of the liquid in the chamber 3 to press the valve 16 to open position, permitting the liquid to flow from the chamber 3 through the passages 14 and 15 into the low pressure chamber 12 from which the liquid is drawn through the pipe 13 to the tank 8. In this way the pressure of the liquid in the grooves 2 is varied to conform to the variation of the pressure above the piston.

Figure 2:
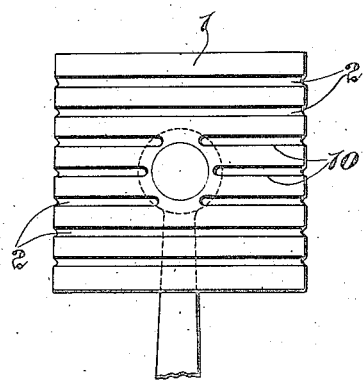
Fig. 2 is a view of the piston removed from the cylinder.
Figure 3:
Fig. 3 is a fragmentary view illustrating the preferred construction of the liquid seal passages in the piston.

I prefer to form the grooves 2 as shown in Fig. 2, their greatest depth being near their lower sides, thus forming sharp edges or shoulders 10 which more effectively retain the liquid during upward movement of the piston.

The liquid is permitted to flow from the grooves 2 through outlet openings 11 across which the piston moves. The openings 11 discharge the liquid into a chamber 12 from which the liquid is conducted through a pipe 13 to the tank 8.

From the foregoing it will be understood that my invention fully accomplishes its object and that, by the form of mechanism shown or any other appropriate form of mechanism, the sealing liquid is constantly supplied under pressure to the grooves in the piston. However, the pressure does not exceed the desired maximum so that the liquid will not be forced between the piston and the wall of the cylinder into the chamber above the piston. The constant flow of liquid cools the piston and the cylinder and will also serve as a lubricant for the parts and prevent accumulation of carbon and other products of combustion upon the cylinder and piston walls.

It is apparent that the mechanism may be varied without departure from the principle of the invention, and it will be understood that I do not restrict myself to unessential features, but what I claim and desire to secure by Letters Patent, is:—

1. The method of packing a piston having circumferential grooves therein, which consists in forcing packing liquid into said grooves from an external source of supply, and varying the pressure of the liquid during reciprocation of the piston.

2. The method of packing a piston having circumferential grooves therein, which consists in forcing packing liquid into said grooves from an external source of supply, varying the pressure of the liquid during reciprocation of the piston, and withdrawing the packing liquid from said grooves to admit fresh supply of packing liquid into the grooves.

3. In an engine, a cylinder having openings through the wall thereof, a piston mounted in the cylinder and provided with circumferential grooves which are moved across said openings during the operation of the piston, means for forcing liquid under pressure through said openings into said grooves, and means for varying the pressure of the liquid in said grooves during operation of the piston.

4. The method of packing pistons having circumferential grooves therein, which consists in forcing under pressure a packing liquid into said grooves from an external chamber, and in varying the pressure in the grooves to prevent the leakage of the liquid from the grooves by reason of pressure within the cylinder due to the reciprocation of the piston.

5. In an engine, a cylinder, a piston mounted for reciprocation in the cylinder having circumferential grooves therein, a water inlet chamber surrounding the cylinder, and communicating with the interior thereof through passage ways, a second chamber constituting an outlet chamber from the cylinder through passage ways through the wall thereof, and a pressure regulating device controlling the communication between said two chambers.

6. In an engine, a cylinder, a piston mounted for reciprocation in the cylinder having circumferential grooves therein, a water inlet chamber in connection with the cylinder and communicating with the interior thereof through passage ways, a second chamber constituting an outlet chamber from the cylinder through passage ways through the wall thereof, and means driven by the engine for forcing liquid under pressure into said first named chamber.

7. In an engine, a cylinder having liquid inlet openings therethrough, and having liquid outlet openings, a liquid supply chamber in communication with said inlet openings, a separate liquid outlet chamber in communication with said outlet openings, a piston mounted in said cylinder having circumferential grooves therein, which are successively moved across the inlet and outlet openings, means for introducing water under pressure into said liquid supply chamber, and a pressure regulating device for controlling the pressure in said liquid supply chamber.

8. In an engine, the combination with a cylinder, of a piston mounted for reciprocation in the cylinder, said piston having circumferential grooves therein, a liquid chamber in communication with the cylinder, a second chamber in communication with the cylinder, means for inducing liquid in said first-named chamber under pressure, and a pressure equalizing device, whereby the pressure in said first-named chamber is reduced as an incident to the downward movement of the piston.

JOHN O. CARREY.